Oct. 5, 1954    A. W. FRANCIS    2,691,048
SEPARATION OF GLYCOLS AND GLYCOL ETHERS
Filed April 20, 1950
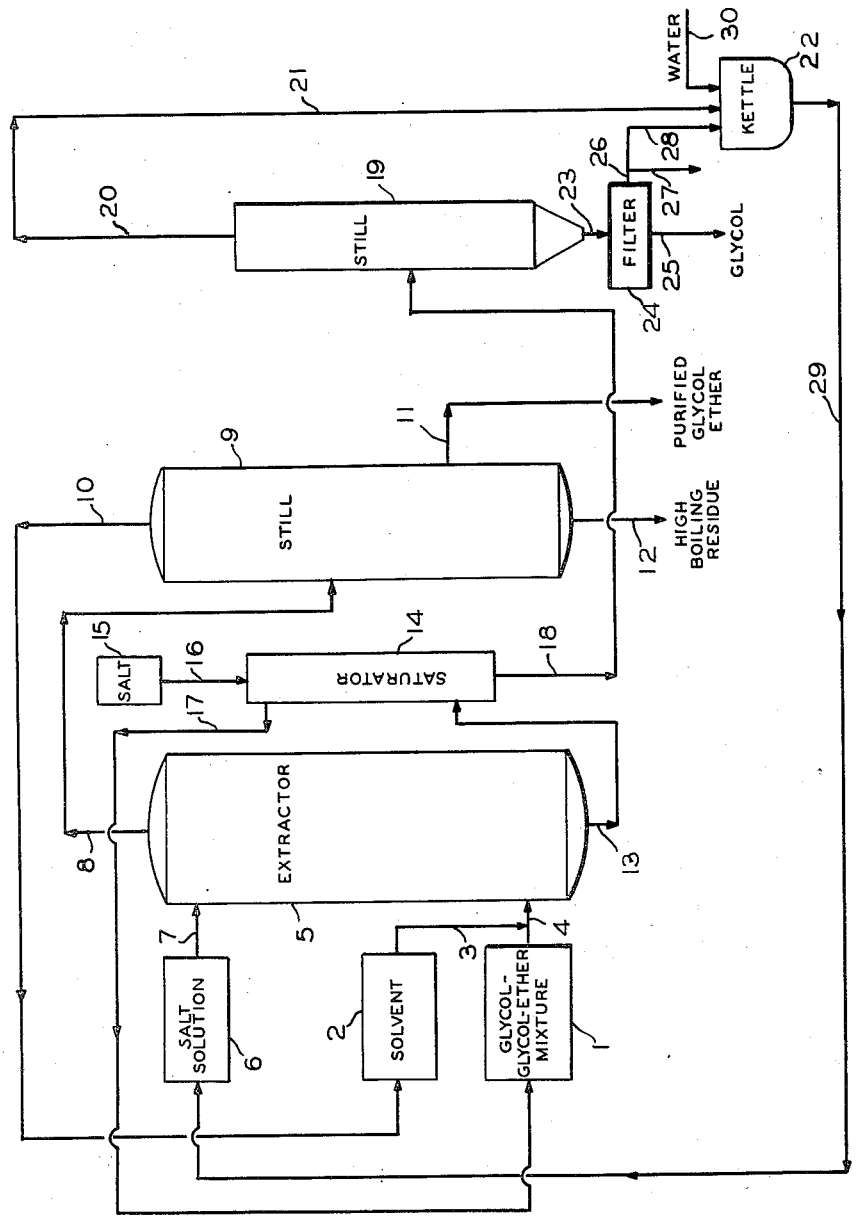
ALFRED W. FRANCIS
INVENTOR.
BY Raymond W. Barclay
ATTORNEY OR AGENT Patented Oct. 5, 1954

2,691,048

UNITED STATES PATENT OFFICE 2,691,048

SEPARATION OF GLYCOLS AND GLYCOL ETHERS

Alfred W. Francis, Woodbury, N. J., assignor to Socony-Vacuum Oil Company, Incorporated, a corporation of New York Application April 20, 1950, Serial No. 157,049

10 Claims. (Cl. 260—615)

This invention relates to a process for resolving a mixture of a glycol and a glycol ether. More particularly, the present invention is concerned with the separation of glycol-glycol ether mixtures having components of close boiling point.

Due to the method of manufacture of glycol ethers, the ultimate product generally contains some of the glycol initially employed as a reactant. The amount of glycol present may vary from a minor proportion up to a considerable quantity, constituting 30% or more of the glycol ether product. Thus, diethylene glycol monoethyl ether, usually referred to as carbitol, ordinarily contains 25% to 29% by weight of ethylene glycol. The closeness in boiling point (197.2° C. for ethylene glycol and 201.9° C. for carbitol) prevents easy separation particularly in view of inadequate stability of the carbitol at its boiling point.

For many purposes a glycol-glycol ether mixture functions as well as the pure ether. However, such mixture is very unsatisfactory as a solvent for hydrocarbon separation because of the large differences in miscibilities of its components. For example, ethylene glycol is not miscible with any hydrocarbon while pure carbitol mixes with most light hydrocarbons at room temperature but not with higher non-aromatic hydrocarbons. Thus, the commercial carbitol mixture containing ethylene glycol when used as a selective solvent is itself extracted, distributing itself unevenly between the liquid phases and giving undesirable irregular results.

The principal object of this invention, accordingly, is the provision of a commercially feasible method for separating glycol-glycol ether mixtures and to thus afford a substantially pure glycol ether which may be employed in those instances wherein the commercial mixture is unsatisfactory.

Attempts to separate glycol-glycol ether mixtures by salting out the ether from aqueous solution has only been partially effective since, from the mixture, the glycol is largely removed along with the glycol ether. This has led to considerable loss of the desired glycol ether during the numerous extractions necessary before all of the glycol is eliminated. Likewise, attempts to separate glycol-glycol ether mixtures by extraction with hydrocarbon solvents, such as gasoline, have not been satisfactory since such solvent extracts only a very small amount of glycol ether from the mixture since the ether remains almost entirely in the glycol layer. Further attempts to separate glycol-glycol ether mixtures have involved dilution of the mixture with an aromatic hydrocarbon, such as benzene, and extraction of the resulting solution with water. While the water preferentially extracts glycol, much of the glycol ether present is also removed, necessitating either further subsequent separation or entailing considerable loss of the glycol ether.

In accordance with the present invention, it has now been discovered that glycol-glycol ether mixtures may be readily separated in an efficient manner by dilution of the mixture with a water-immiscible solvent and thereafter extracting the resulting solution with an aqueous salt or alkali solution. The aqueous salt or alkali solution under such conditions has been found to behave as an effective extractant for the glycol, removing with it only a minor proportion of glycol ether. The resulting extract and raffinate phases are thereafter separated. The raffinate phase containing glycol ether and the aforementioned solvent is then subjected to distillation, the solvent passing overhead to yield a resultant product of pure glycol ether. The solvent is recovered and may be recycled for further use. The small amount of glycol ether present in the extract phase may conveniently be recovered by saturating this phase with a water-soluble salt, preferentially, although not necessarily the same salt employed in the aqueous extracting solution. The glycol ether layer so separated out and containing some glycol may, if desired, be returned to the original glycol-glycol ether mixture. The remaining extract phase containing an aqueous salt or alkali solution of the glycol may then be resolved by distilling off the water and separating the resulting mixture of glycol and salt or alkali by filtration or other suitable means. The glycol so separated is a substantially pure product. The salt or alkali is recovered in a form suitable for re-use.

The process of this invention has been found, as will be shown hereinafter, to provide an efficient procedure for separating glycol and glycol ether mixtures. Moreover, the process may be carried out in a continuous cyclic operation to provide a commercially attractive method for resolving glycol-glycol ether mixtures. While it is contemplated that the process of this invention may be employed in effecting separation of glycol-glycol ethers generally, the process has been found to be particularly useful in resolving glycol-glycol ether mixtures having close boiling points. Typical examples of glycol-glycol ether mixtures having components characterized by close boiling points which may be effectively separated by the process of this invention are shown in the following table:

| Component A | Boiling Point, °C. | Component B | Boiling Point, °C. |
|---|---|---|---|
| Ethylene Glycol | 197.2 | Carbitol | 201.9 |
| Propylene Glycol | 188.2 | Diethyl Carbitol | 188.9 |
| Ethylene Glycol | 197.2 | Methyl Carbitol | 194.2 |
| Ethylene Glycol | 197.2 | Ethylbutyl Cellosolve | 196.8 |
| Diethylene Glycol | 245 | Phenyl Cellosolve | 244.7 |

The solvent employed herein for dilution of the glycol-glycol ether mixture is characterized by a substantially complete miscibility with the mixture and substantially complete immiscibility with water. Typical organic solvents useful in the present process include the light aromatic hydrocarbons, such as benzene, toluene, xylene; halogenated paraffins, such as chloroform and carbon tetrachloride; thiophene; and other water-immiscible solvents. It is desirable that the particular solvent used should have a boiling point appreciably lower than that of the glycol ether to be separated in order to enable an easy subsequent removal of said solvent by distillation. The solvent, furthermore, should be inert to the glycol and glycol ether components making up the mixture.

The amount of solvent employed will generally be present in an amount of at least 0.5 volume per volume of mixture undergoing separation. Generally, the amount of solvent present will be between about 0.5 and about 2 volumes of solvent per volume of mixture. Too great an amount of solvent, while doing no apparent harm, is to be avoided since the subsequent separation of a large quantity of solvent from the raffinate phase of glycol ether and solvent is a cumbersome and time-consuming operation. For most purposes about an equal volume of solvent per volume of mixture has been found to be satisfactory.

The aqueous extracting solution employed contains dissolved therein a substantial amount of a water-soluble salt or base so that only minimum amounts of glycol ether will be extracted when said solution is contacted with the solvent solution of the glycol-glycol ether mixture. It is contemplated that any water-soluble salt or alkali inert to the glycol-glycol ether mixture may be employed in the present process as a suitable extracting agent. Thus, representative compounds which may be utilized for this purpose include potassium carbonate, sodium chloride, sodium hydroxide, sodium sulfate, sodium nitrate, ammonium chloride, potassium nitrate, sodium carbonate, sodium acetate, potassium hydroxide, and the like. The particular salt or alkali chosen will be dependent upon the nature of the glycol-glycol ether mixture to be separated. As a general rule, however, the less expensive and more readily available compounds will be employed. The minimum concentration of salt or alkali present will, as pointed out hereinabove, be such that substantially no glycol ether is extracted from the solvent solution of glycol-glycol ether mixture. This particular concentration will vary with the nature of the mixture with which the aqueous extracting solution is brought into contact. However, it has been found that for most purposes the minimum concentration which will effect the desired separation is about 15% by weight. The concentration of salt or alkali present may vary from this minimum amount up to and including saturated solutions.

The following examples will serve to illustrate the procedure of this invention:

Example 1

One hundred milliliters of a mixture of ethylene glycol and diethylene glycol monoethyl ether containing about 26% by volume of ethylene glycol were diluted with 100 milliliters of benzene. To the resulting solution 10 milliliters of an aqueous solution of 25% by weight potassium carbonate were added. The mixture was then agitated, yielding 23 milliliters of a lower layer, which was withdrawn. Another 10 milliliters of the aqueous potassium carbonate solution was added. The mixture was again agitated, yielding 20 milliliters of extract. A third increment of 10 milliliters of the potassium carbonate solution gave 14.3 milliliters of extract, a fourth increment 13.2 milliliters, and a fifth increment 12.0 milliliters. These extracts were combined and saturated with potassium carbonate, giving 11.2 milliliters of an upper layer containing most of the ether removed during extraction, together with some of the glycol. The upper layer from the original extraction was distilled, giving complete recovery of benzene along with a minor amount of water, 60 milliliters of diethylene glycol monoethyl ether, and about 5 milliliters of a residue which appeared to be diethylene glycol. The ether fraction of the distillate showed a critical solution temperature with n-heptane of 25° C., indicating that it was pure, since the temperature was the same as that observed with n-heptane and a sample of diethylene glycol monoethyl ether known to be pure. In contrast, the original charge stock failed to mix with n-heptane at temperatures up to 120° C.

Example 2

One hundred twenty milliliters of a mixture of ethylene glycol and diethylene glycol monoethyl ether containing about 26% by volume of ethylene glycol was diluted with 120 milliliters of benzene. The resulting solution was extracted four times with 10 milliliter portions of an aqueous solution of 30% by weight sodium hydroxide, giving extract volume of 30 milliliters, 16 milliliters, 12.3 milliliters, and 10.8 milliliters, respectively. These extracts were combined and saturated with potassium carbonate, giving 1.4 milliliters of an upper layer containing most of the ether removed by extraction, together with some of the glycol. This upper layer may, if desired, be recycled to the original charge stock. The upper layer from the original extraction was distilled as in Example 1 to yield a carbitol fraction having a critical solution temperature with n-heptane of 26° C., indicating that this product was practically pure.

The procedure of this invention may be carried out either as a batch process as described above or as a continuous operation. From a commercial viewpoint, a cyclic operation will generally be found to be more satisfactory. A suitable continuous process for effecting the separation of glycol-glycol ether mixtures in accordance with the present procedure is shown in diagrammatic form in the drawing attached hereto. Referring more particularly to the drawing, it will be seen that the glycol-glycol ether mixture to be treated contained in tank 1 is mixed with a suitable quantity of solvent introduced from tank 2 through conduit 3. The resulting solution is then led through conduit 4 into the lower portion of an extractor 5. An aqueous solution of a salt is introduced from tank 6 through conduit 7 into the upper portion of extractor 5. The solvent solution of the glycol-glycol ether mixture and the aqueous extracting solution flow countercurrent to one another in the extractor, thereby providing an intimate contact. The raffinate phase containing solvent and glycol ether is removed from the top of the extractor by pipe 8 through which it is conducted to still 9, having a suitable number of trays, where the solvent is removed as an overhead product and recycled through conduit 10 to the solvent feed tank 2. The purified glycol ether is withdrawn from still 9 at an intermediate point through pipe 11 and is conducted to suitable storage means not shown. Any residue in the bottom of still 9 is withdrawn through outlet pipe 12. The extract phase is withdrawn from the bottom of extractor 5 through pipe 13 and is conducted into a saturator 14. A supply of salt is fed from tank 15 through conduit 16 into the upper portion of said saturator. The extract solution of aqueous salt solution containing the glycol and a small amount of the glycol ether is thus saturated with additional salt in saturator 14, resulting in the formation of an upper layer containing the small amount of glycol ether present in the extract, together with some glycol. This layer is removed from the upper portion of saturator 14 through conduit 17 and is recycled through said conduit to glycol-glycol ether mixture feed tank 1. The remaining aqueous salt solution of glycol is withdrawn from the bottom of the saturator through pipe 18 and is conducted into still 19, wherein water is removed as the overhead product through pipe 20 and is conducted via pipe 21 into a kettle 22. The bottom product from still 19, consisting of a slushy mixture of glycol and salt, is conducted out of the bottom of the still through outlet pipe 23 and is passed through a filter 24, in which the salt present is removed. The separated glycol is withdrawn from the filter through line 25. The salt from filter 24 is removed through pipe 26 and a portion thereof is withdrawn through pipe 27, the remaining salt being led through conduit 28 into kettle 22. The aqueous solution of salt contained in kettle 22 is then recycled via conduit 29 to the original feed tank of salt solution. Any make-up water needed is introduced into kettle 22 through pipe 30. The salt removed through pipe 27 may, if desired, be recycled to tank 15.

It is to be understood that the examples, procedures, and specific chemical reagents described hereinabove are illustrative only and are not to be construed as limiting the scope of this invention thereto. Thus, in addition to the particular glycol-glycol ether mixtures set forth herein, it is contemplated that other such mixtures may likewise be effectively resolved by the process of this invention.

I claim:

1. A process for separating a mixture consisting essentially of a major proportion of an ether selected from the group consisting of a monoether of a monoalkylene glycol, a diether of a monoalkylene glycol, a monoether of a polyalkylene glycol and a diether of a polyalkylene glycol and a minor proportion, up to about 30 per cent by weight, of a glycol, which comprises dilution of said mixture with between about 0.5 and about 2 volumes of an organic solvent per volume of mixture, said solvent being characterized by substantially complete miscibility with said mixture and substantially complete immiscibility with water and by being inert to the glycol and ether components of said mixture and by having a boiling point appreciably lower than that of the ether component, extraction of the diluted mixture with an aqueous solution of a compound selected from water-soluble salts and water-soluble bases, separation of the resulting extract and raffinate phases and distillation of the separated raffinate phase, driving solvent therefrom as overhead and yielding a substantially pure product consisting of the ether component of said mixture.

2. The process of claim 1 further characterized in that said organic solvent is an aromatic hydrocarbon.

3. The process of claim 1 further characterized in that said organic solvent is benzene.

4. The process of claim 1 further characterized in that said organic solvent is carbon tetrachloride.

5. The process of claim 1 further characterized in that said ether is diethylene glycol monoethyl ether and said glycol is ethylene glycol.

6. A process for separating a mixture consisting essentially of a major proportion of an ether selected from the group consisting of a monoether of a monoalkylene glycol, a diether of a monoalkylene glycol, a monoether of a polyalkylene glycol and a diether of a polyalkylene glycol and a minor proportion, up to about 30 per cent by weight of a glycol, which comprises diluting said mixture with between about 0.5 and about 2 volumes of an organic solvent per volume of mixture, said solvent being characterized by substantially complete miscibility with said mixture and substantially complete immiscibility with water and by being inert to the glycol and ether components of said mixture and by having a boiling point appreciably lower than that of the ether component, extracting the diluted mixture with an aqueous solution of a water-soluble salt, separating the resulting extract and raffinate phases, distilling the separated raffinate phase, removing solvent therefrom as overhead and yielding a bottoms product consisting of the substantially pure ether component of said mixture, salting out the small amount of ether component contained in the separated extract, thereby removing said ether component from said extract phase, returning the separated ether component to the original mixture, distilling the remaining extract phase, driving water therefrom as overhead and yielding a bottoms product of the glycol component of said mixture and salt and filtering the salt from said bottoms product to yield a filtrate consisting of the substantially pure glycol component of said mixture.

7. The process of claim 6 further characterized in that said ether is diethylene glycol monoethyl ether and said glycol is ethylene glycol.

8. A continuous process for resolving a mixture consisting essentially of a major proportion of an ether selected from the group consisting of a monoether of a monoalkylene glycol, a diether of a monoalkylene glycol, a monoether of a polyalkylene glycol and a diether of a polyalkylene glycol and a minor proportion, up to about 30 per cent by weight, of a glycol, which comprises diluting said mixture with between about 0.5 and about 2 volumes of an organic solvent per volume of mixture, said solvent being characterized by substantially complete miscibility with said mixture and substantially complete immiscibility with water and by being inert to the glycol and ether components of said mixture and by having a boiling point appreciably lower than that of the ether component, feeding said diluted mixture to an extraction zone counter-current to the flow of an aqueous solution of a water-soluble salt through said zone, continuously removing extract and raffinate phases from said extraction zone, feeding the raffinate phase to a fractionating column, withdrawing solvent from said column as overhead, recycling said solvent to further contact with the original mixture and withdrawing the purified ether component of said mixture from the lower portion of said column.

9. The process of claim 8 further characterized in that said ether is diethylene glycol monoethyl ether and said glycol is ethylene glycol.

10. A continuous process for resolving a mixture consisting essentially of a major proportion of an ether selected from the group consisting of a monoether of a monoalkylene glycol, a diether of a monoalkylene glycol, a monoether of a polyalkylene glycol, and a diether of a polyalkylene glycol and a minor proportion, up to about 30 per cent by weight, of a glycol, which comprises diluting said mixture with between about 0.5 and about 2 volumes of an organic solvent per volume of mixture, said solvent being characterized by substantially complete miscibility with said mixture and substantially complete immiscibility with water and by being inert to the glycol and ether components of said mixture and by having a boiling point appreciably lower than that of the ether component, feeding said diluted mixture to an extraction zone counter-current to the flow of an aqueous solution of a water-soluble salt through said zone, removing the raffinate phase from said extraction zone, feeding said raffinate phase to a fractionating column, withdrawing solvent from said column as overhead, recycling said solvent to further contact with the original mixture, withdrawing the purified ether component of said mixture from the lower portion of said column, removing the extract phase from said extraction zone, salting out a small amount of the ether component contained in said extract phase, recycling said ether component to the original mixture, feeding the remaining extract phase to a distillation tower, withdrawing water vapor from said tower as overhead, condensing said water vapor, conducting the water so obtained to a reservoir, withdrawing a mixture of the glycol component and salt from the lower portion of said tower, filtering salt from said mixture, collecting a filtrate of the substantially pure glycol component, conducting the separated salt to the aforesaid reservoir and recycling aqueous salt solution from said reservoir to the aqueous salt feed solution.

References Cited in the file of this patent

UNITED STATES PATENTS

| Number | Name | Date |
|---|---|---|
| 1,189,602 | Michaelis | July 4, 1916 |
| 1,312,475 | Flaherty | Aug. 5, 1919 |
| 2,050,600 | Cox et al. | Aug. 11, 1936 |
| 2,407,820 | Durrum | Sept. 17, 1946 |
| 2,425,845 | Toussaint et al. | Aug. 19, 1947 |
| 2,485,329 | Steele et al. | Oct. 18, 1949 |

OTHER REFERENCES

Lawrie: "Glycerol and the Glycols," pages 361–381 (1928), The Chemical Catalog Co., Inc. New York.

Lange: "Handbook of Chemistry," 6th ed. (1946), Handbook Publishers Inc., Sandusky, Ohio.